United States Patent [19]

Kobayashi et al.

[11] 4,218,366
[45] Aug. 19, 1980

[54] CONDENSATION PRODUCT OF 4,4'-DIHYDROXYDIPHENYL SULFONE, 4,4'-DIHYDROXYDIPHENYLSULFONE SULFONIC ACID AND A LOWER ALDEHYDE AND METHOD OF PREPARATION

[75] Inventors: Akio Kobayashi, Toyonaka; Yoshiyuki Shimohiro, Sakai; Kisaburou Shimizu, Osaka; Yoshiaki Murakami, Kobe, all of Japan

[73] Assignee: Dainippon Pharmaceutical Co., Ltd., Osaka, Japan

[21] Appl. No.: 551,994

[22] Filed: Feb. 21, 1975

[30] Foreign Application Priority Data

Feb. 21, 1974 [JP] Japan .................................. 49-21232
Oct. 3, 1974 [JP] Japan ................................ 49-114549

[51] Int. Cl.² .......................... C08G 8/18; C08G 8/20
[52] U.S. Cl. ...................................... 528/143; 210/24
[58] Field of Search ............................ 260/49; 210/24

[56] References Cited

U.S. PATENT DOCUMENTS

| 2,716,098 | 8/1955 | Biedermann | 260/49 |
| 3,290,111 | 12/1966 | Hees et al. | 8/74 |
| 3,687,603 | 8/1972 | Abel et al. | 8/23 |

Primary Examiner—Lester L. Lee
Attorney, Agent, or Firm—Armstrong, Nikaido, Marmelstein & Kubovcik

[57] ABSTRACT

A fixing agent for improving the fastness properties of dyeings on polyamide fibers being a new condensation product of 4,4'-dihydroxydiphenylsulfone, 4,4'-dihydroxydiphenylsulfonesulfonic acid and a lower aliphatic aldehyde, which has a mean molecular weight of about 5,000 to about 30,000 and a ratio of carbon atom content and sulfur atom content of 3.0:1 to 4.8:1, or its metal salt, and when polyamide fibers are treated with the condensation product or its metal salt, or the condensation product in the presence of a salt of metal, at a temperature of 95° to 120° C., the fastness properties, especially wet-fastness properties of dyeings on polyamide fibers are remarkably improved.

10 Claims, No Drawings

CONDENSATION PRODUCT OF 4,4'-DIHYDROXYDIPHENYL SULFONE, 4,4'-DIHYDROXYDIPHENYLSULFONE SULFONIC ACID AND A LOWER ALDEHYDE AND METHOD OF PREPARATION

BACKGROUND OF THE INVENTION

The present invention relates to a new fixing agent and a process for improving the fastness properties, especially the wet-fastness properties such as the fastness to washing, to hot water, to perspiration or to water, of dyeings on polyamide fibers.

Generally, polyamide fibers are dyed by acid-dyestuffs. However, the employment of only acid-dyestuffs merely gives very poor fastness properties of dyeings. For this reason, there have been adopted a variety of means for improving the fastness properties of dyeings by employing fixing agents. Among them, a two bath method employing tannic acid and tartar emetic has been known to be the most effective in the viewpoint of fixing dyestuffs on the fibers. This two bath method gives fairly good wet-fastness properties but is poor in the operating efficiency because of its procedure consisting of two steps, i.e. tannic acid treatment and tartar emetic treatment, which results in a high cost. Further, according to this method, the color matching of dyed fibers is very difficult because the colors of dyeings on fibers are liable to change of shade. The employment of tartar emetic necessitates an additional facilities for removing toxic tartar emetic from the waste water of bath. Besides, the supply of tannic acid is unstable from the viewpoint of its raw material and its cost is fairly high.

As one of alternative means for improving the above-mentioned defects of such tannic acid-tartar emetic method, there has been proposed a method employing as a fixing agent a condensation product of sulfonated 4,4'-dihydroxydiphenylsulfone and a lower aliphatic aldehyde such as formaldehyde or acetaldehyde, for instance, as described in British Pat. No. 975,307. That is to say, in this patent, there is described a method for improving the wet-fastness properties of dyeings on polyamide fibers by after-treating a dyed fiber with the condensation product at 80° C. However, even this method is still inferior to the tannic acid-tartar emetic treatment with respect to the effect of fixing dyestuffs on fibers, especially is poor in resistance against steam setting.

OBJECTS OF THE INVENTION

An object of the present invention is to provide a new fixing agent for improving the fastness properties of dyeings on polyamide fibers.

The other object of the invention is to provide a novel process for preparing a new fixing agent being capable of fast fixing acid-dyestuffs on polyamide fibers.

Another object of the invention is to provide a process for improving the fastness properties of dyeings on polyamide fibers.

These and other objects of the invention will be apparent from the following description.

DETAILED DESCRIPTION OF THE INVENTION

The present inventors, as a result of examining the relationship between the constitution of a condensation product of 4,4'-dihydroxydiphenylsulfone, 4,4'-dihydroxydiphenylsulfonesulfonic acid and a lower aliphatic aldehyde as a fixing agent and the conditions for treating fibers therewith, and the fastness properties of dyeings on polyamide fibers, have found that the molecular weight of the condensation product and the numbers of sulfonic acid moiety contained therein, and the temperature for treating polyamide fibers therewith have an important effect on the fastness properties, and the employment of the condensation product in combination with a salt of metal such as calcium chloride, which is generally capable of forming with a compound having sulfonic acid moiety a metal salt which is slightly soluble in water, still more improves the fastness properties. That is to say, it has been found that the superior fastness properties of dyeings on polyamide fibers which has never been expected from the prior art can be attained by employing as a fixing agent a condensation product of 4,4'-dihydroxydiphenylsulfone, its sulfonic acid and a lower aliphatic aldehyde which is characterized by a specified mean molecular weight of about 5,000 to about 30,000 and a specified ratio of carbon atom content and sulfur atom content of 3.0:1 to 4.8:1, or its metal salt prepared by reacting the condensation product with a salt of metal, and treating polyamide fibers with the condensation product or its metal salt, or with condensation product in the presence of a salt of metal, at a comparatively high temperature of 95° to 120° C.

The process of the present invention is entirely different from that concretely disclosed in British Pat. No. 975,307 with respect to the fixing agent employed and the temperature for treating polyamide fibers therewith. The fixing agent employed in this patent is a condensation product prepared by sulfonating 1.0 mole of dihydroxydiphenyl sulfone with 1.0 to 1.5 moles of sulfuric acid and condensing the obtained sulfonated 4,4'-dihydroxydiphenylsulfone with 0.5 to 1.0 mole of aldehyde. According to the present inventors' study, the employment of such proportions of the reaction components merely gives a condensation product of which portions occupying more than 80% by weight has a molecular weight of 250 to 1,250 and a ratio of carbon atom content and sulfur atom content of 2.8:1 to 2.9:1. In the prior patent, it is also mentioned that such a known condensation product shows a desirable effect of improving the fastness properties of dyeings with after treatment (different bath-after treatment) at 80° C. In other words, according to the present invention, the fastness properties being remarkably superior to those obtained by the prior patent can be attained by employing different fixing agent and different temperature condition from the prior patent.

In addition, the effect of improving the fastness properties of dyeings according to the present invention is superior to even those achieved by the tannic acid-tartar emetic method which has been known to be the most excellent among the prior art, and the procedures for treating polyamide fibers with the fixing agent in the present invention are simpler than those in the tannic acid-tartar emetic method.

In the present invention, it is essential to employ, among condensation products of 4,4'-dihydroxydiphenylsulfone, its sulfonic acid and a lower aliphatic aldehyde, the specific condensation product having a mean molecular weight of about 5,000 to about 30,000 and a ratio of carbon atom content and sulfur atom content of 3.0:1 to 4.8:1. The new condensation product is soluble in water. The reason why only such a specific condensation product exhibits an outstanding fixing effect is not necessarily defined, but such an effect is deemed to be caused by the fact that the adsorption equilibrium of the specific condensation product between its aqueous solution and a polyamide fiber is extremely favorable onto the polyamide fiber to result in excellent fixing effect. The condensation products having a molecular weight and a ratio of carbon atom content and sulfur atom content deviating from the above-specified ranges are not preferable since the effects of fixing dyestuffs on polyamide fibers are considerably decreased.

The process of the present invention is applicable to all kinds of polyamide fibers, for instance, 6 nylon, 6-6 nylon, 6-10 nylon, and yarns or cloths made of such fibers.

The new fixing agent of the present invention is prepared by treating 4,4'-dihydroxydiphenylsulfone with sulfuric acid, condensing the resultant with a lower aliphatic aldehyde, fractionating the obtained condensation product to give a fraction having a mean molecular weight of about 5,000 to about 30,000 and a ratio of carbon atom content and sulfur atom content of 3.0:1 to 4.8:1.

In the present invention, it is essential to sulfonate 4,4'-dihydroxydiphenylsulfone so that the average molar ratio of 4,4'-dihydroxydiphenylsulfonesulfonic acid to free 4,4'-dihydroxydiphenylsulfone in the resultant is from 0.015 to 1.1. In the case the average number of sulfonic acid moiety deviates from the above range, it is impossible to obtain a ratio of carbon atom content and sulfur atom content of 3.0:1 to 4.8:1. The reaction conditions for the sulfonation are selected so as to satisfy the above-specified degree of sulfonation. The amount of sulfuric acid employed is preferably from 0.8 to 1.0 mole per 1.0 mole of 4,4'-dihydroxydiphenylsulfone. As a sulfuric acid, a sulfuric acid having a concentration of 95 to 100% by weight is preferably employed. Preferable reaction temperature for the sulfonation ranges from 110° to 130° C. Preferable reaction period for the sulfonation ranges from 1 to 5 hours. In the present invention, it is preferable to employ acetic anhydride as a reaction solvent so as to carry out the sulfonation homogeneously. Preferable amount of acetic anhydride is from 0.7 to 2.0 moles per 1.0 mole of 4,4'-dihydroxydiphenylsulfone. Usually, the obtained reaction mixture is employed as it is for the next step.

The sulfonated product is then condensed with a lower aliphatic aldehyde. Examples of the lower aliphatic aldehyde include formaldehyde and acetaldehyde. Formaldehyde may be employed in a form of its aqueous solution, i.e. formalin. Preferable concentration of formalin is usually from 25 to 40% by weight. In the present invention, it is essential to select the amount of such a lower aliphatic aldehyde from the range of 1.0 to 1.2 moles per 1.0 mole of 4,4'-dihydroxydiphenylsulfone. As a result, the desired fraction having a mean molecular weight of about 5,000 to about 30,000 can be obtained in a high yield. In the case the amount of the lower aliphatic aldehyde is less than the above range, the proportion of the fraction having a mean molecular weight of less than about 5,000 increases remarkably. On the other hand, in the case the amount of the lower aliphatic aldehyde is more than the above range, the proportion of the fraction having a molecular weight of more than about 30,000 increases remarkably.

In general, the condensation reaction is preferably carried out at a temperature of from 90° to 110° C. for 2 to 4 hours under a normal pressure to give a good result. The elevated pressures may be also employed. In the condensation step, the yield of the desired fraction reaches to over 35% by weight calculated on the basis of the total amount of condensation product. The obtained reaction mixture is usually employed as it is for the next fractionation step.

Thus obtained crude condensation product is then fractionated. As the fractionation method, conventional fractionation method such as gel filtration method may be employed alone or in combination. In the most preferred embodiment of the present invention, the combination of a solvent-treatment method and a gel filtration method is employed because of high efficiency. This combination method is explained in detail as follows:

The crude condensation product is preliminarily fractionated by treating it with a mixture of water and an organic solvent being not miscible with water. Preferable examples of the organic solvent include aliphatic esters such as ethyl acetate, n-propyl acetate, isopropyl acetate, diethyl adipate and diethyl succinate, and aliphatic ketones such as diethyl ketone, methyl isobutyl ketone and methyl n-butyl ketone. The crude condensation product is sufficiently agitated together with water and an organic solvent and then allowed to stand to separate into three layers. The three layers consist of an organic solvent layer, a water layer and a specific layer. The specific layer locates in the lower layer with an organic solvent such as ethyl acetate, n-propyl acetate, diethyl succinate, and in the middle layer with methyl isobutyl ketone. In addition, the specific layer consists of a concentrated aqueous solution of the desired condensation product. The organic solvent layer contains mainly unreacted starting materials and locates in the upper layer. The water layer consists of an aqueous solution containing mostly a fraction having a lower molecular weight. The amount of an organic solvent employed is preferably from 2 to 20 times that of 4,4'-dihydroxydiphenylsulfone used as a starting material. Preferable proportion of water and an organic solvent is in a ratio of from 7:3 to 1:4 by weight. The specific layer containing the desired fraction is taken out. In this stage, the purity of the desired fraction reaches to over 60% by weight. This fraction may be employed for the next fixing treatment, as it is or after purification by the following methods.

The separated layer is subjected to further fractionation by a gel filtration method employing a molecular sieve. Such a gel filtration method is well-known to persons skilled in the art and they will be readily able to understand the technique in the present invention of fractionating the condensation product to obtain a fraction having a mean molecular weight of about 5,000 to about 30,000. As a molecular sieve for the gel filtration method, Sephadex G-25 (made by Pharmacia Fine Chemicals AB) is preferably employed. According to the gel filtration, the fractions having a molecular weight of less than about 5,000 are removed to give the desired fraction having a mean molecular weight of about 5,000 to about 30,000 and a ratio of carbon atom content and sulfur atom content of 3.0:1 to 4.8:1 at a purity of 95 to 100%. The desired condensation product may be recovered from the aqueous eluate by concentrating it to dryness or may be employed for the use of the invention in a form of solution obtained by concentrating the aqueous eluate appropriately.

In the present invention, thus obtained desired condensation product may be further reacted with a salt of metal. The salt of metal is one which is generally capable of forming with a compound having sulfonic acid moiety a metal salt which is slightly soluble in water. Preferable examples of the salt of metal include calcium chloride, barium chloride, magnesium sulfate, magnesium chloride, aluminum sulfate, aluminum chloride, ferrous sulfate and ferric sulfate. More preferable examples are calcium chloride, magnesium chloride and magnesium sulfate. The amount of such a salt of metal employed varies widely depending upon a kind of salt of metal employed but at least is selected so that the obtained metal salt is clearly soluble in water in fixing treatment. In general, the salt of metal is employed in a range of from 1 to 30% by weight, more preferably from 2 to 15% by weight to the amount of the desired condensation product.

The fixing agent of the present invention, i.e., the above-mentioned condensation product or its metal salt is employed as follows: In an embodiment, the fixing agent is added to a dyeing bath together with a dyestuff. Then the dyeing bath is gradually heated to a temperature of 95° to 120° C., more preferably 100° to 110° C. and maintained at the same temperature for 10 to 30 minutes (same bath-simultaneous treatment). In other embodiment, after dyeing is completed, the fixing agent is added to a dyeing bath, and then the dyeing bath is heated at a temperature of 95° to 120° C., preferably 100° to 110° C. for 10 to 30 minutes (same bath-after treatment). A heating temperature of dyeing bath less than 95° C. is not preferable since the fixing effect of the fixing agent of the present invention cannot be sufficiently exhibited. In another embodiment, the condensation product may be employed together with a salt of metal. As such a salt of metal, the same salt of metal as employed for preparing the metal salt of the condensation product is also preferably employed. In that case, the amount of the salt of metal employed may be the same as that in the case of preparing the metal salt of the condensation product. According to this embodiment, more excellent effects can be obtained than those achieved by the single employment of the condensation product.

The present invention is more particularly described and explained by means of the following illustrative Examples in which all "parts" mean "parts by weight".

EXAMPLE 1

To 300 parts of acetic anhydride was added with agitation 250 parts of 4,4'-dihydroxydiphenylsulfone. Thereto was added with agitation 80 parts of a 98% by weight sulfuric acid and the mixture was heated at 120° C. for 2 hours. The resultant was then mixed with 132 parts of a 25% by weight of formalin and heated at 100° C. for 4 hours to give 760 parts of a solution of the condensation product.

To the solution was added 2,300 parts of ethyl acetate and 985 parts of water. The mixture was agitated and allowed to stand so as to separate into three layers. After the separation was completed, the lower layer was taken out to give 540 parts of an aqueous solution (solid content: 35% by weight/volume).

The aqueous solution was passed through a column packed with 300 parts of Sephadex G-25, followed by the successive passing of 500 parts of water. The eluate was concentrated to dryness to give 126 parts of a powdery product.

The obtained powdery product has a mean molecular weight of about 8,000 and a ratio of carbon atom content and sulfur atom content of 4.5:1. The molecular weight was determined according to the gel filtration method employing Sephadex G-25 as a packing and acid-dyestuffs, C.I. acid orange 7, C.I. acid red 88 and C.I. acid red 114 as standard reagents. The ratio of carbon atoms content and sulfur atom content was determined by the elementary analysis.

EXAMPLE 2

Into 150 parts of water was dissolved 126 parts of the product obtained in Example 1. The solution was mixed with 6 parts of magnesium sulfate and agitated for 30 minutes. The reaction mixture was concentrated to dryness to give 130 parts of a powdery product.

EXAMPLE 3

To 100 parts of acetic anhydride was added with agitation 250 parts of 4,4'-dihydroxydiphenylsulfone. Thereto was added with agitation 90 parts of a 98% by weight sulfuric acid and the mixture was heated at 120° C. for 2 hours. The resultant was then mixed with 132 parts of a 25% by weight formalin and heated at 95° to 100° C. for 2 hours to give 568 parts of a solution of the condensation product.

To the solution were added 2,500 parts of methyl isobutyl ketone and 1,000 parts of water. The mixture was agitated and allowed to stand so as to separate three layers. After the separation was completed, the middle layer was taken out to give 550 parts of an aqueous solution (solid content: 35% by weight/volume).

The solution was passed through a column packed with 300 parts of Sephadex G-25, followed by the successive passing of 500 parts of water. The eluate was concentrated to dryness to give 130 parts of a powdery product.

The obtained product has a mean molecular weight of 12,000 and a ratio of carbon atom content and sulfur atom content of 4.0:1.

EXAMPLE 4

Into 150 parts of water was dissolved 130 parts of the product obtained in Example 3. The solution was mixed with 2 parts of calcium chloride and agitated for 30 minutes. The reaction mixture was concentrated to dryness to give 132 parts of a powdery product.

EXAMPLE 5

To 100 parts of acetic anhydride was added with agitation 250 parts of 4,4'-dihydroxydiphenylsulfone. Thereto was added with agitation 84 parts of a 98% by weight of sulfuric acid and the mixture was heated at 110° C. for 4 hours. The resultant was then mixed with 125 parts of a 25% by weight formalin and heated at 95° to 100° C. for 4 hours to give 560 parts of a solution of the condensation product.

To the solution were added 3,000 parts of n-propyl acetate and 1,000 parts of water. The mixture was agitated and allowed to stand so as to separate into three layers. After the separation was completed, the lower layer was taken out to give 550 parts of an aqueous solution (solid content: 35% by weight/volume).

The aqueous solution was passed through a column packed with 300 parts of Sephadex G-25, followed by the successive passing of 500 parts of water. The eluate was concentrated to dryness to give 128 parts of a powdery product.

The obtained product has a mean molecular weight of 10,000 and a ratio of carbon atom content and sulfur atom content of 4.3:1.

EXAMPLE 6

Into 150 parts of water was dissolved 128 parts of the product obtained in Example 5. The solution was mixed with 5 parts of magnesium chloride and agitated for 30 minutes. The reaction mixture was concentrated to dryness to give 130 parts of a powdery product.

EXAMPLE 7

To 300 parts of acetic anhydride was added with agitation 250 parts of 4,4'-dihydroxydiphenylsulfone. Thereto was added with agitation 80 parts of a 98% by weight sulfuric acid and the mixture was heated at 130° C. for 4 hours. The resultant was then mixed with 80 parts of a 37% by weight of formalin and heated at 100° C. for 4 hours.

The obtained condensation product was dissolved into a 50% by weight aqueous solution of acetic acid and the solution was passed through a column packed with 500 parts of Sephadex G-25. The fraction eluted with a 50% by weight aqueous solution of acetic acid at a break through point was collected and concentrated to dryness to give 150 parts of a powdery product.

The obtained product has a mean molecular weight of 10,000 and a ratio of carbon atom content and sulfur atom content of 4.3:1.

COMPARATIVE EXAMPLE 1

To 125 parts of acetic anhydride was added with agitation 250 parts of 4,4'-dihydroxydiphenylsulfone. Thereto was added with agitation 125 parts of a 98% by weight sulfuric acid and the mixture was heated at 98° to 100° C. for 5 to 6 hours. The resultant was then mixed with 71.5 parts of a 30% by weight of formalin and heated at 105° C. for 5 hours. The resultant was concentrated to dryness to give 370 parts of a pasty product (known fixing agent).

The obtained product has a mean molecular weight of 1,000 and a ratio of carbon atom content and sulfur atom content of 2.8:1.

EXAMPLES 8 TO 13

"Woolic" nylon yarn 80 deniers (made of 6-nylon fiber) was dipped at 20° C. into a dyeing bath containing 2% o.w.f. of C.I. acid blue 129 and 3% o.w.f. of acetic acid (48% by weight) at a liquor-to-goods-ratio of 50:1. At the same time, the fixing agent obtained in Example 1 was added to the dyeing bath so as to reach to 2.5% o.w.f. The dyeing bath was gradually heated to reach to a temperature of 100° C. and maintained at the same temperature for 30 minutes. The treated yarn was then rinsed and dried.

The same procedure was repeated with each fixing agent obtained in Examples 2 to 6.

The fastnesses to washing, to hot water, to perspiration and to water of the dyed nylon yarns after steam-set at 120° C. for 60 seconds were determined according to the methods provided in JIS L 0844 A No. 2, JIS L 0845 No. 2, JIS L 0848 A and JIS L 0846 A, respectively. The results thereof are shown in Table 1. In Table 1, the numerical values on the column "Fastness" are graduations on the gray scale (provided in JIS L 0805) for determining a degree of staining on white cloths which are stained by the dyestuff fallen out from the dyed nylon yarns. The numerical value 5 shows the lowest staining and the numerical value 1 shows the highest staining.

Table 1

| Example | Fixing agent | Fastness of dyeing |  |  |  |
|---|---|---|---|---|---|
|  |  | Washing | Hot water | Perspiration | Water |
| 8 | Example 1 | 4 to 5 | 4 to 5 | 5 | 5 |
| 9 | Example 2 | 4 to 5 | 4 to 5 | 5 | 5 |
| 10 | Example 3 | 4 | 4 | 5 | 5 |
| 11 | Example 4 | 4 to 5 | 4 to 5 | 5 | 5 |
| 12 | Example 5 | 4 to 5 | 4 to 5 | 5 | 5 |
| 13 | Example 6 | 4 to 5 | 4 to 5 | 5 | 5 |

EXAMPLE 14

Nylon jersey (made of 6-nylon fiber) was dipped at 25° C. into a dyeing bath containing 2% o.w.f. of C.I. acid blue 129 and 3% o.w.f. of acetic acid (48% by weight) at a liquor-to-goods-ratio of 50:1. At the same time, the fixing agent obtained in Example 7 was added to the dyeing bath so as to reach to 2.5% o.w.f. The dyeing bath was gradually heated with the elevation of 2.5° C. per minute up to 100° C. and maintained at the same temperature for 60 minutes. The treated cloth was then rinsed and dried. Such a treatment with a fixing agent together with a dyestuff in the same bath on a fiber is hereinafter referred to as "same bath-simultaneous treatment".

EXAMPLE 15

The same nylon jersey employed in Example 14 was dipped into a dyeing bath containing 2% o.w.f. of C.I. acid blue 129 and 3% o.w.f. of acetic acid (48% by weight) at a liquor-to-goods-ratio of 50:1, and dyed at 100° C. for 30 minutes. After dyeing, the fixing agent obtained in Example 7 was added to the dyeing bath so as to reach to 2.5% o.w.f. and the dyeing bath was heated at 100° C. for 30 minutes. The treated cloth was then rinsed and dried. Such a treatment with a fixing agent on a fiber previously dyed is hereinafter referred to as "same bath-after treatment".

EXAMPLE 16

The procedure of Example 14 was repeated except that magnesium sulfate was added to the dyeing bath together with the fixing agent obtained in Example 7, the amount of magnesium sulfate being 5% by weight of the fixing agent. (same bath-simultaneous treatment)

EXAMPLE 17

The procedure of Example 15 was repeated except that magnesium sulfate was added to the dyeing bath after dyeing together with the fixing agent obtained in Example 7, the amount of magnesium sulfate being 5% by weight of the fixing agent. (same bath-after treatment)

COMPARATIVE EXAMPLE 2

The procedure of Example 14 was repeated except that the dyeing bath was heated at 80° C. for 60 minutes. (same bath-simultaneous treatment)

COMPARATIVE EXAMPLE 3

The procedure of Example 15 was repeated except that the dyeing bath after dyeing was heated at 80° C. for 30 minutes. (same bath-after treatment)

COMPARATIVE EXAMPLE 4

The procedure of Example 16 was repeated except that the dyeing bath was heated at 80° C. for 60 minutes. (same bath-simultaneous treatment)

COMPARATIVE EXAMPLE 5

The procedure of Example 17 was repeated except that the dyeing bath after dyeing was heated at 80° C. for 30 minutes. (same bath-after treatment)

COMPARATIVE EXAMPLES 6 TO 7

The same nylon jersey employed in Example 14 was dipped into a dyeing bath containing 2% o.w.f. of C.I. acid blue 129 and 3% o.w.f. of acetic acid (48% by weight) at a liquor-to-goods-ratio of 50:1. The dyeing bath was gradually heated with the elevetion of 2.5° C. per minute up to 100° C. and maintained at the same temperature for 60 minutes. The dyed cloth after washing with water was dipped into the fixing bath containing the fixing agent obtained in Comparative Example 1 (known fixing agent), of 2.5% o.w.f. at a liquor-to-goods-ratio of 30:1 and heated at 100° C. for 30 minutes (Comparative Example 6) or 80° C. for 30 minutes (Comparative Example 7). The treated cloth was then rinsed and dried. (different bath-after treatment)

COMPARATIVE EXAMPLE 8

The same nylon jersey employed in Example 14 was dipped into a dyeing bath containing 2% o.w.f. of C.I. acid blue 129 and 3% o.w.f. of acetic acid (48% by weight) at a liquor-to-goods-ratio of 50:1. The dyeing bath was gradually heated with the elevation of 2.5° C. per minute up to 100° C. and maintained at the same temperature for 60 minutes. The dyed cloth after washed with water was dipped into a tannic acid bath of 3% o.w.f. at a liquor-to-goods-ratio of 30:1 and heated at 80° C. for 30 minutes. The cloth treated with tannic acid was washed with water, dipped into a tartar emetic bath of 1.5% o.w.f. at a liquor-to-goods-ratio of 30:1 and then heated at 80° C. for 20 minutes. The treated cloth was rinsed and washed. (two bath-after treatment)

COMPARATIVE EXAMPLE 9

The same nylon jersey employed in Example 14 was dipped into a dyeing bath containing 2% o.w.f. of C.I. acid blue 129 and 3% o.w.f. of acetic acid (48% by weight) at a liquor-to-goods-ratio of 50:1. The dyeing bath was gradually heated with the elevation of 2.5° C. per minute up to 100° C. and maintained at the same temperature for 60 minutes. The dyed cloth was rinsed and washed.

The fastnesses of the dyed cloths obtained in Examples 14 to 17 and Comparative Examples 2 to 9 were determined in the same manner as described in Examples 8 to 13. The results thereof are shown in Table 2. In Table 2, A, B, C and D in column "Treatment" show the same bath-simultaneous treatment, same bath-after treatment, different bath-after treatment and two bath-after treatment, respectively.

EXAMPLES 18 TO 21 AND COMPARATIVE EXAMPLES 10 TO 17

The procedures of Examples 14 to 17 and Comparative Examples 2 to 9 were repeated, respectively, except that "Woolic" nylon yarn of 80 deniers was employed instead of the nylon jersey.

The fastnesses of the dyeings obtained on the nylon yarns are shown in Table 3.

EXAMPLES 22 TO 25 AND COMPARATIVE EXAMPLES 18 TO 25

The procedures of Examples 14 to 17 and Comparative Examples 2 to 9 were repeated, respectively, except that C.I. acid red 114 of 3% o.w.f. was employed instead of C.I. acid blue 129 of 2% o.w.f.

The fastnesses of the dyeings obtained on the nylon cloths are shown in Table 4.

EXAMPLES 26 TO 29 AND COMPARATIVE EXAMPLES 26 TO 33

The procedures of Examples 14 to 17 and Comparative Examples 2 to 9 were repeated, respectively, except that C.I. acid red 114 of 3% o.w.f. and "Woolic" nylon yarn of 80 deniers were employed instead of C.I. acid blue 129 of 2% o.w.f. and nylon jersey.

The fastnesses of the dyeings obtained on the nylon yarns are shown in Table 5.

EXAMPLES 30 TO 33 AND COMPARATIVE EXAMPLES 34 TO 41

The procedures of Examples 14 to 17 and Comparative Examples 2 to 9 were repeated, respectively, except that C.I. acid yellow 44 of 3% o.w.f. was employed instead of C.I. acid blue of 2% o.w.f.

The fastnesses of the dyeing obtained on the nylon cloths are shown in Table 6.

EXAMPLES 34 TO 37 AND COMPARATIVE EXAMPLES 42 TO 49

The procedures of Examples 14 to 17 and Comparative Examples 2 to 9 were repeated, respectively, except that C.I. acid yellow 44 of 3% o.w.f. and "Woolic" nylon yarn of 80 deniers were employed instead of C.I. acid blue 129 of 2% o.w.f. and nylon jersey.

The fastnesses of the dyeings obtained on the nylon yarns are shown in Table 7.

EXAMPLES 38 TO 41 AND COMPARATIVE EXAMPLES 50 TO 59

The procedures of Examples 14 to 17 and Comparative Examples 2 to 9 were repeated, respectively, except that C.I. acid red 257 of 2% o.w.f. was employed instead of C.I. acid blue 129 of 2% o.w.f.

The fastnesses of the dyeings obtained on the nylon cloths are shown in Table 8.

EXAMPLES 42 TO 45 AND COMPARATIVE EXAMPLES 58 TO 65

The procedures of Examples 14 to 17 and Comparative Examples 2 to 9 were repeated, respectively, except that C.I, acid red 257 of 2% o.w.f. and "Woolic" nylon yarns of 80 deniers were employed instead of C.I. acid blue 129 of 2% o.w.f. and nylon jersey.

The fastnesses of the dyeings obtained on the nylon yarns are shown in Table 9.

With respect to the effect of the fixing agent obtained in Comparative Example 1 (known fixing agent), the treatment "A" or "B" is inferior to the treatment "C", in either case at 80° C. or at 100° C.

Table 2

| Example | Fixing agent | Metal salt | Treatment* | Temp.(°C.) | Fastness of dyeing | | | |
|---|---|---|---|---|---|---|---|---|
| | | | | | Washing | Hot water | Perspiration | Water |
| 14 | Example 7 | — | A | 100 | 4 | 4 to 5 | 5 | 5 |
| 15 | Example 7 | — | B | 100 | 4 | 4 to 5 | 5 | 5 |
| 16 | Example 7 | MgSO$_4$ | A | 100 | 4 to 5 | 4 to 5 | 5 | 5 |
| 17 | Example 7 | MgSO$_4$ | B | 100 | 4 to 5 | 4 to 5 | 5 | 5 |
| Comparative Example 2 | Example 7 | — | A | 80 | 2 | 1 to 2 | 3 | 3 |
| Comparative Example 3 | Example 7 | — | B | 80 | 2 | 1 to 2 | 3 | 3 |
| Comparative Example 4 | Example 7 | MgSO$_4$ | A | 80 | 2 | 1 to 2 | 3 | 3 |
| Comparative Example 5 | Example 7 | MgSO$_4$ | B | 80 | 2 | 1 to 2 | 3 | 3 |
| Comparative Example 6 | Comparative Example 1 | — | C | 100 | 1 | 1 | 2 to 3 | 2 to 3 |
| Comparative Example 7 | Comparative Example 1 | — | C | 80 | 1 | 1 | 2 to 3 | 2 to 3 |
| Comparative Example 8 | Tannic acid-tartar emetic | — | D | 80 | 2 to 3 | 2 | 3 to 4 | 3 to 4 |
| Comparative Example 9 | — | — | — | — | 1 | 1 | 1 to 2 | 1 to 2 |

*A: "same bath-simultaneous treatment"
B: "same bath-after treatment"
C: "different bath-after treatment"
D: "two bath-after treatment"

Table 3

| Example | Fixing agent | Metal salt | Treatment | Temp.(°C.) | Fastness of dyeing | | | |
|---|---|---|---|---|---|---|---|---|
| | | | | | Washing | Hot water | Perspiration | Water |
| 18 | Example 7 | — | A | 100 | 4 to 5 | 4 to 5 | 5 | 5 |
| 19 | Example 7 | — | B | 100 | 4 to 5 | 4 to 5 | 5 | 5 |
| 20 | Example 7 | MgSO$_4$ | A | 100 | 4 to 5 | 4 to 5 | 5 | 5 |
| 21 | Example 7 | MgSO$_4$ | B | 100 | 4 to 5 | 4 to 5 | 5 | 5 |
| Comparative Example 10 | Example 7 | — | A | 80 | 3 | 3 | 4 to 5 | 4 to 5 |
| Comparative Example 11 | Example 7 | — | B | 80 | 3 | 3 | 4 to 5 | 4 to 5 |
| Comparative Example 12 | Example 7 | MgSO$_4$ | A | 80 | 3 | 3 | 4 to 5 | 4 to 5 |
| Comparative Example 13 | Example 7 | MgSO$_4$ | B | 80 | 3 | 3 | 4 to 5 | 4 to 5 |
| Comparative Example 14 | Comparative Example 1 | — | C | 100 | 1 to 2 | 1 | 2 to 3 | 2 to 3 |
| Comparative Example 15 | Comparative Example 1 | — | C | 80 | 1 to 2 | 1 | 2 to 3 | 2 to 3 |
| Comparative Example 16 | Tannic acid-tartar emetic | — | D | 80 | 3 to 4 | 2 | 3 to 4 | 3 to 4 |
| Comparative Example 17 | — | — | — | — | 2 | 1 | 1 to 2 | 1 to 2 |

Table 4

| Example | Fixing agent | Metal salt | Treatment | Temp.(°C.) | Fastness of dyeing | | | |
|---|---|---|---|---|---|---|---|---|
| | | | | | Washing | Hot water | Perspiration | Water |
| 22 | Example 7 | — | A | 100 | 5 | 4 to 5 | 5 | 5 |
| 23 | Example 7 | — | B | 100 | 5 | 4 to 5 | 5 | 5 |
| 24 | Example 7 | MgSO$_4$ | A | 100 | 5 | 5 | 5 | 5 |
| 25 | Example 7 | MgSO$_4$ | B | 100 | 5 | 5 | 5 | 5 |
| Comparative Example 18 | Example 7 | — | A | 80 | 4 | 2 to 3 | 4 | 4 |
| Comparative Example 19 | Example 7 | — | B | 80 | 4 | 2 to 3 | 4 | 4 |
| Comparative Example 20 | Example 7 | MgSO$_4$ | A | 80 | 4 | 2 to 3 | 4 | 4 |
| Comparative Example 21 | Example 7 | MgSO$_4$ | B | 80 | 4 | 2 to 3 | 4 | 4 |
| Comparative Example 22 | Comparative Example 1 | — | C | 100 | 3 | 1 to 2 | 3 | 3 |
| Comparative Example 23 | Comparative Example 1 | — | C | 80 | 2 to 3 | 1 | 2 to 3 | 2 to 3 |
| Comparative Example 24 | Tannic acid-tartar emetic | — | D | 80 | 5 | 2 to 3 | 4 | 4 |
| Comparative Example 25 | — | — | — | — | 2 | 1 | 1 to 2 | 1 to 2 |

Table 5

| Example | Fixing agent | Metal salt | Treatment | Temp.(°C.) | Fastness of dyeing | | | |
|---|---|---|---|---|---|---|---|---|
| | | | | | Washing | Hot water | Perspiration | Water |
| 26 | Example 7 | — | A | 100 | 5 | 3 to 4 | 4 to 5 | 4 to 5 |
| 27 | Example 7 | — | B | 100 | 5 | 3 to 4 | 4 to 5 | 4 to 5 |
| 28 | Example 7 | MgSO$_4$ | A | 100 | 5 | 4 | 5 | 5 |
| 29 | Example 7 | MgSO$_4$ | B | 100 | 5 | 4 | 4 to 5 | 4 to 5 |
| Comparative Example 26 | Example 7 | — | A | 80 | 3 | 1 to 2 | 3 | 3 |
| Comparative Example 27 | Example 7 | — | B | 80 | 3 | 1 to 2 | 3 | 3 |
| Comparative Example 28 | Example 7 | MgSO$_4$ | A | 80 | 3 | 1 to 2 | 3 | 3 |
| Comparative Example 29 | Example 7 | MgSO$_4$ | B | 80 | 3 | 1 to 2 | 3 | 3 |
| Comparative Example 30 | Comparative Example 1 | — | C | 100 | 2 to 3 | 1 to 2 | 3 | 3 |
| Comparative Example 31 | Comparative Example 1 | — | C | 80 | 2 | 1 | 2 to 3 | 2 to 3 |
| Comparative Example 32 | Tannic acid-tartar emetic | — | D | 80 | 4 to 5 | 2 | 3 to 4 | 3 to 4 |
| Comparative Example 33 | — | — | — | — | 2 | 1 | 1 to 2 | 1 to 2 |

Table 6

| Example | Fixing agent | Metal salt | Treatment | Temp.(°C.) | Fastness of dyeing | | | |
|---|---|---|---|---|---|---|---|---|
| | | | | | Washing | Hot water | Perspiration | Water |
| 30 | Example 7 | — | A | 100 | 5 | 4 to 5 | 5 | 5 |
| 31 | Example 7 | — | B | 100 | 5 | 4 to 5 | 5 | 5 |
| 32 | Example 7 | MgSO$_4$ | A | 100 | 5 | 5 | 5 | 5 |
| 33 | Example 7 | MgSO$_4$ | B | 100 | 5 | 5 | 5 | 5 |
| Comparative Example 34 | Example 7 | — | A | 80 | 4 to 5 | 3 | 4 to 5 | 4 to 5 |
| Comparative Example 35 | Example 7 | — | B | 80 | 4 to 5 | 2 to 3 | 4 | 4 |
| Comparative Example 36 | Example 7 | MgSO$_4$ | A | 80 | 4 to 5 | 3 | 4 to 5 | 4 to 5 |
| Comparative Example 37 | Example 7 | MgSO$_4$ | B | 80 | 4 to 5 | 2 to 3 | 4 | 4 |
| Comparative Example 38 | Comparative Example 1 | — | C | 100 | 3 to 4 | 2 | 3 | 3 |
| Comparative Example 39 | Comparative Example 1 | — | C | 80 | 3 to 4 | 2 | 3 | 3 |
| Comparative Example 40 | Tannic acid-tartar emetic | — | D | 80 | 5 | 3 | 4 to 5 | 4 to 5 |
| Comparative Example 41 | — | — | — | — | 3 | 2 | 1 to 2 | 1 to 2 |

Table 7

| Example | Fixing agent | Metal salt | Treatment | Temp.(°C.) | Fastness of dyeing | | | |
|---|---|---|---|---|---|---|---|---|
| | | | | | Washing | Hot water | Perspiration | Water |
| 34 | Example 7 | — | A | 100 | 5 | 5 | 5 | 5 |
| 35 | Example 7 | — | B | 100 | 5 | 5 | 5 | 5 |
| 36 | Example 7 | MgSO$_4$ | A | 100 | 5 | 5 | 5 | 5 |
| 37 | Example 7 | MgSO$_4$ | B | 100 | 5 | 5 | 5 | 5 |
| Comparative Example 42 | Example 7 | — | A | 80 | 4 to 5 | 3 to 4 | 4 to 5 | 4 to 5 |
| Comparative Example 43 | Example 7 | — | B | 80 | 4 to 5 | 3 to 4 | 4 to 5 | 4 to 5 |
| Comparative Example 44 | Example 7 | MgSO$_4$ | A | 80 | 4 to 5 | 3 to 4 | 4 to 5 | 4 to 5 |
| Comparative Example 45 | Example 7 | MgSO$_4$ | B | 80 | 4 to 5 | 3 to 4 | 4 to 5 | 4 to 5 |
| Comparative Example 46 | Comparative Example 1 | — | C | 100 | 3 to 4 | 2 to 3 | 4 | 4 |
| Comparative Example 47 | Comparative Example 1 | — | C | 80 | 3 | 2 to 3 | 4 | 4 |
| Comparative Example 48 | Tannic acid-tartar emetic | — | D | 80 | 5 | 3 to 4 | 4 to 5 | 4 to 5 |
| Comparative Example 49 | — | — | — | — | 3 | 2 | 1 to 2 | 1 to 2 |

Table 8

| Example | Fixing agent | Metal salt | Treatment | Temp.(°C.) | Fastness of dyeing Washing | Hot water | Perspiration | Water |
|---|---|---|---|---|---|---|---|---|
| 38 | Example 7 | — | A | 100 | 3 to 4 | 4 | 4 to 5 | 4 to 5 |
| 39 | Example 7 | — | B | 100 | 3 to 4 | 3 | 4 to 5 | 4 to 5 |
| 40 | Example 7 | MgSO₄ | A | 100 | 4 | 3 to 4 | 4 to 5 | 4 to 5 |
| 41 | Example 7 | MgSO₄ | B | 100 | 4 | 3 to 4 | 4 to 5 | 4 to 5 |
| Comparative Example 50 | Example 7 | — | A | 80 | 2 | 1 | 2 to 3 | 2 to 3 |
| Comparative Example 51 | Example 7 | — | B | 80 | 2 | 1 | 2 to 3 | 2 to 3 |
| Comparative Example 52 | Example 7 | MgSO₄ | A | 80 | 2 | 1 | 2 to 3 | 2 to 3 |
| Comparative Example 53 | Example 7 | MgSO₄ | B | 80 | 2 | 1 | 2 to 3 | 2 to 3 |
| Comparative Example 54 | Comparative Example 1 | — | C | 100 | 1 | 1 | 2 to 3 | 2 to 3 |
| Comparative Example 55 | Comparative Example 1 | — | C | 80 | 1 | 1 | 2 to 3 | 2 to 3 |
| Comparative Example 56 | Tannic acid-tartar emetic | — | D | 80 | 2 to 3 | 1 | 2 to 3 | 2 to 3 |
| Comparative Example 57 | — | — | — | — | 1 | 1 | 1 to 2 | 1 to 2 |

Table 9

| Example | Fixing agent | Metal salt | Treatment | Temp. (°C.) | Fastness of dyeing Washing | Hot water | Perspiration | Water |
|---|---|---|---|---|---|---|---|---|
| 42 | Example 7 | — | A | 100 | 4 | 3 to 4 | 4 to 5 | 4 to 5 |
| 43 | Example 7 | — | B | 100 | 4 | 3 to 4 | 4 to 5 | 4 to 5 |
| 44 | Example 7 | MgSO₄ | A | 100 | 4 | 3 to 4 | 4 to 5 | 4 to 5 |
| 45 | Example 7 | MgSO₄ | B | 100 | 4 | 3 to 4 | 4 to 5 | 4 to 5 |
| Comparative Example 58 | Example 7 | — | A | 80 | 2 to 3 | 1 | 2 to 3 | 2 to 3 |
| Comparative Example 59 | Example 7 | — | B | 80 | 2 to 3 | 1 | 2 to 3 | 2 to 3 |
| Comparative Example 60 | Example 7 | MgSO₄ | A | 80 | 2 to 3 | 1 | 2 to 3 | 2 to 3 |
| Comparative Example 61 | Example 7 | MgSO₄ | B | 80 | 2 to 3 | 1 | 2 to 3 | 2 to 3 |
| Comparative Example 62 | Comparative Example 1 | — | C | 100 | 1 to 2 | 1 | 2 to 3 | 2 to 3 |
| Comparative Example 63 | Comparative Example 1 | — | C | 80 | 1 to 2 | 1 | 2 to 3 | 2 to 3 |
| Comparative Example 64 | Tannic acid-tartar emetic | — | D | 80 | 3 | 1 to 2 | 3 | 3 |
| Comparative Example 65 | — | — | — | — | 1 | 1 | 1 to 2 | 1 to 2 |

What we claim is:

1. A condensation product mixture of 4,4'-dihydroxydiphenylsulfone, 4,4'-dihydroxydiphenylsulfonesulfonic acid and a lower aliphatic aldehyde, or its salt with a metal selected from the group consisting of calcium, barium, magnesium, aluminum and iron; said 4,4'-dihydroxydiphenylsulfone and 4,4'-dihydroxydiphenylsulfonesulfonic acid being a product mixture formed by treating 1.0 mole of 4,4'-dihydroxydiphenylsulfone with 0.8 to 1.0 mole of sulfuric acid so that the average molar ratio of 4,4'-dihydroxydiphenylsulfonesulfonic acid to free 4,4'-dihydroxydiphenylsulfone in the resultant mixture is from 0.015 to 1.1; the condensation product mixture having a mean molecular weight of about 5,000 to about 30,000 and a ratio of carbon atom content and sulfur atom content of 3.0:1 to 4.8:1.

2. The condensation product mixture of claim 1, wherein said condensation product mixture has a mean molecular weight of about 5,000 to about 15,000 and a ratio of carbon atom content and sulfur atom content of 4.0:1 to 4.4:1.

3. A process for preparing a condensation product of 4,4'-dihydroxydiphenylsulfone, 4,4'-dihydroxydiphenylsulfonesulfonic acid and a lower aliphatic aldehyde which comprises treating 1.0 mole of 4,4'-dihydroxydiphenylsulfone with 0.8 to 1.0 mole of sulfuric acid so that the average molar ratio of 4,4'-dihydroxydiphenylsulfonesulfonic acid to free 4,4'-dihydroxydiphenylsulfone in the resultant is from 0.015 to 1.1, condensing the resultant with 1.0 to 1.2 moles of a lower aliphatic aldehyde, and fractionating the crude condensation product to obtain a condensation product having a mean molecular weight of about 5,000 to 30,000 and a ratio of carbon atom content and sulfur atom content being 3.0:1 to 4.8:1.

4. The process of claim 3, wherein said lower aliphatic aldehyde is formaldehyde or acetaldehyde.

5. The process of claim 3, wherein said lower aliphatic aldehyde is formaldehyde.

6. The process of claim 3, wherein the treating is carried out at a temperature of 110° to 130° C. for 1 to 5 hours.

7. The process of claim 3, wherein the treating is carried out in the presence of acetic anhydride.

8. The process of claim 3, wherein the condensing is carried out at a temperature of 90° to 110° C. for 2 to 4 hours.

9. The process of claim 3, wherein the fractionating is carried out by treating the crude condensation product with a mixture of water and an organic solvent not miscible in water to form three layers, taking out a layer containing the desired condensation product from said three layers and passing the layer through a column packed with a molecular sieve to give the desired condensation product.

10. The process of claim 9, wherein said organic solvent is selected from the group consisting of ethyl acetate, n-propyl acetate, isopropyl acetate, diethyl adipate, diethyl succinate, diethyl ketone, methyl isobutyl ketone and methyl n-butyl ketone.

* * * * *